(12) United States Patent
Yamashita et al.

(10) Patent No.: US 8,118,331 B2
(45) Date of Patent: Feb. 21, 2012

(54) NON-BOLT JOINT STRUCTURE AND METHOD FOR PRODUCING NON-BOLT JOINT STRUCTURE

(75) Inventors: Tamotsu Yamashita, Shiga (JP); Taihei Yokoyama, Shiga (JP)

(73) Assignee: Suiken Co., Ltd., Shiga (JP)

( * ) Notice: Subject to any disclaimer, the term of this patent is extended or adjusted under 35 U.S.C. 154(b) by 445 days.

(21) Appl. No.: 12/131,261

(22) Filed: Jun. 2, 2008

(65) Prior Publication Data
US 2008/0303277 A1 Dec. 11, 2008

(30) Foreign Application Priority Data

Jun. 5, 2007 (JP) .............................. 2007-149081
Mar. 14, 2008 (WO) ................. PCT/JP2008/054767

(51) Int. Cl.
*F16L 47/00* (2006.01)
(52) U.S. Cl. ........ 285/256; 285/113; 285/239; 285/382; 285/382.5; 29/523
(58) Field of Classification Search .................. 285/100, 285/113, 239, 256, 338, 382, 382.1, 382.2, 285/382.4, 382.5, 233–234; 29/207, 522.1, 29/523, 507
See application file for complete search history.

(56) References Cited

U.S. PATENT DOCUMENTS

| | | | | |
|---|---|---|---|---|
| 1,428,949 A | * | 9/1922 | Eastman | 285/249 |
| 3,545,794 A | * | 12/1970 | Wise et al. | 285/248 |
| 3,596,933 A | * | 8/1971 | Luckenbill | 285/94 |
| 3,814,466 A | * | 6/1974 | Leopold, Jr. | 285/55 |
| 3,972,548 A | | 8/1976 | Roseen | |
| 4,256,335 A | * | 3/1981 | Nielsen, Jr. | 285/250 |
| 4,805,945 A | | 2/1989 | Foucault et al. | |
| 5,295,718 A | | 3/1994 | Bartholomew | |
| 5,341,566 A | | 8/1994 | Quitschau et al. | |
| 5,622,394 A | * | 4/1997 | Soles et al. | 285/256 |
| 5,992,898 A | * | 11/1999 | Saylor | 285/55 |

(Continued)

FOREIGN PATENT DOCUMENTS

EP 0 139 500 5/1985

(Continued)

OTHER PUBLICATIONS

UK search report corresponding to application No. GB 0810309.5 dated Sep. 24, 2008.

(Continued)

*Primary Examiner* — Aaron Dunwoody
*Assistant Examiner* — Fannie Kee
(74) *Attorney, Agent, or Firm* — Renner, Otto, Boisselle & Sklar, LLP (57) ABSTRACT

A non-bolt joint structure comprising; a packing ring sealing between a receiving opening section and an insertion opening section; an engaging means provided with an inner circumference of the receiving opening section preventing a polyethylene pipe from disengaging from the receiving opening section by engaging with an outer circumferential surface of the polyethylene pipe; and a tubular metallic inner core fitting an inner circumference of the insertion opening section of the polyethylene pipe, wherein the inner core is plastically deformed to include a first bulge portion that its cross-sectional shape bulges toward an outward radial direction, a second bulge portion is formed so that the insertion opening section of the polyethylene pipe bulges toward the outward radial direction along the first bulge portion of the inner core, and the polyethylene pipe is prevented from disengaging by the engaging means engaging with the outer circumferential surface of the second bulge portion.

11 Claims, 11 Drawing Sheets

U.S. PATENT DOCUMENTS

2007/0108765 A1 * 5/2007 Hayakawa .................... 285/347

FOREIGN PATENT DOCUMENTS

| EP | 1460324 | 9/2004 |
|---|---|---|
| GB | 2019760 | 11/1979 |
| GB | 2294304 | 4/1996 |
| GB | 2418713 | 4/2006 |
| JP | 59115810 | 7/1984 |
| JP | 1-174690 | 12/1989 |
| JP | 10-082487 | 3/1998 |
| JP | 11-201342 | 7/1999 |
| JP | 11-201343 | 7/1999 |
| JP | 11-270763 | 10/1999 |
| JP | 2001-124278 | 5/2001 |
| JP | 2005-061549 | 3/2005 |
| NL | 6609961 | 1/1967 |

OTHER PUBLICATIONS

Translation of Dutch search report corresponding to application No. NL 2001649 dated Dec. 19, 2008.

* cited by examiner

FIG.1

FIG.3A: Pre-deformation

FIG.3B: Post-deformation

FIG.6A: Pre-deformation

FIG.6B: Post-deformation

FIG.11A : Pre-deformation   FIG.11B : Post-deformation

NON-BOLT JOINT STRUCTURE AND METHOD FOR PRODUCING NON-BOLT JOINT STRUCTURE

BACKGROUND OF THE INVENTION

1. Field of the Invention

The present invention relates to a non-bolt joint structure and a method for producing the non-bolt joint structure.

2. Description of the Related Art

It is often the case that a welded joint welding pipes with each other in a construction field is used for connecting polyethylene pipes. There is, however, a variety of disadvantages when pipes are welded in the construction field.

Japanese Utility model Laid-Open No. 1-174690 referenced in International Search Report of PCT/JP2008/054767 on which the present application claims priority based, describes a joint connecting a polyethylene pipe and a metallic pipe with each other. The joint structure of this prior art is shown in FIG. 5A.

Figure 5A:
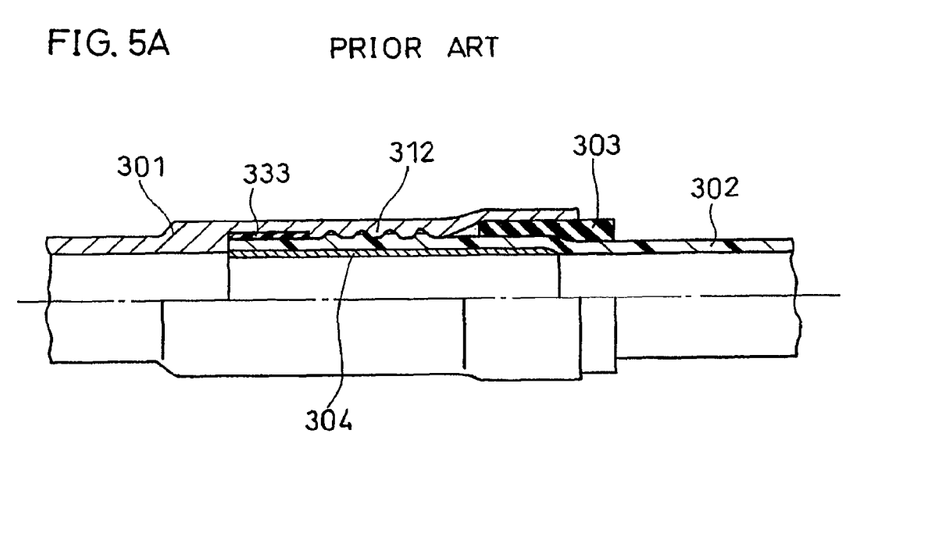
FIG. 5A and FIG. 5B are schematic cross sectional views each showing a conventional non-bolt joint structure which is publicly known.

As shown in FIG. 5A, a metallic pipe 304 expands a flexible pipe 302. The flexible pipe 302 cuts into an inner circumference ditch portion 312 of a joint 301. Numerals 303 and 333 are packing rings for sealing.

However, unless the flexible pipe 302 is melted and gets soft, it is difficult for the flexible pipe 302 to cut into the inner circumference ditch portion 312 of the joint 301 with expanding the metallic pipe 304. Therefore, there is no record describing that this structure is employed.

Figure 5B:
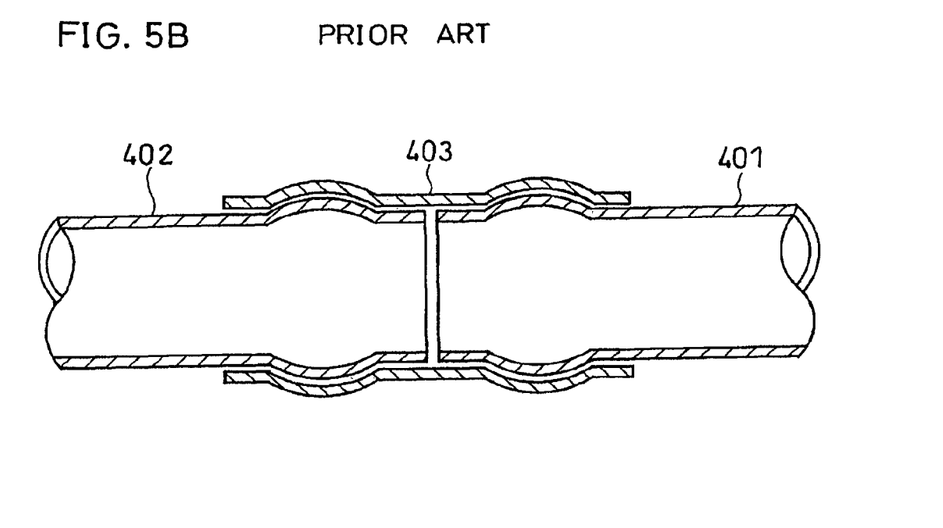

As shown in FIG. 5B, Japanese Patent Laid-Open No. 11-201343 describes that steel pipes 401 and 402 are covered with a steel sleeve 403, and then diameters of the steel pipes 401, 402 and the steel sleeve 403 are expanded to be plastically deformed.

And, it also describes that a seal member such as a rubber ring is provided on each side of sleeves for improving cutoff performance.

That is, above two documents do not describe that the cross-sectional shape of the polyethylene pipe is curved as an arc with an inner ring.

Japanese Patent Laid-Open No. 2005-61549 describes that a joint connects a polyethylene pipe with a receiving opening section integrally being in communication with a valve casing.

Japanese Patent Laid-Open No. 11-201342 describes a connecting structure in which a resin header is connected with a metallic joint.

Japanese Patent Laid-Open No. 10-82487 describes a technique in which a pipe is nipped between both inner and outer sleeves.

U.S. Pat. No. 3,972,548 describes that a first pipe expanded its diameter of ends is fitted into a second pipe.

U.S. Pat. No. 4,805,945 describes a joint in which pressure is applied to an end of a tube from an inner side, and then the tube is tucked in a sleeve.

EP0139500A2 describes forming a bulge portion in the way that an end of a pipe is inserted into a pre-forming processed joint and then the end of the pipe is plastically deformed by such as a die.

Japanese Patent Laid-Open No. 2001-124278, 2005-61549, and 11-270763 describe a non-bolt joint structure.

An example of a non-bolt joint structure described above is described in FIG. 4.

Figure 4:
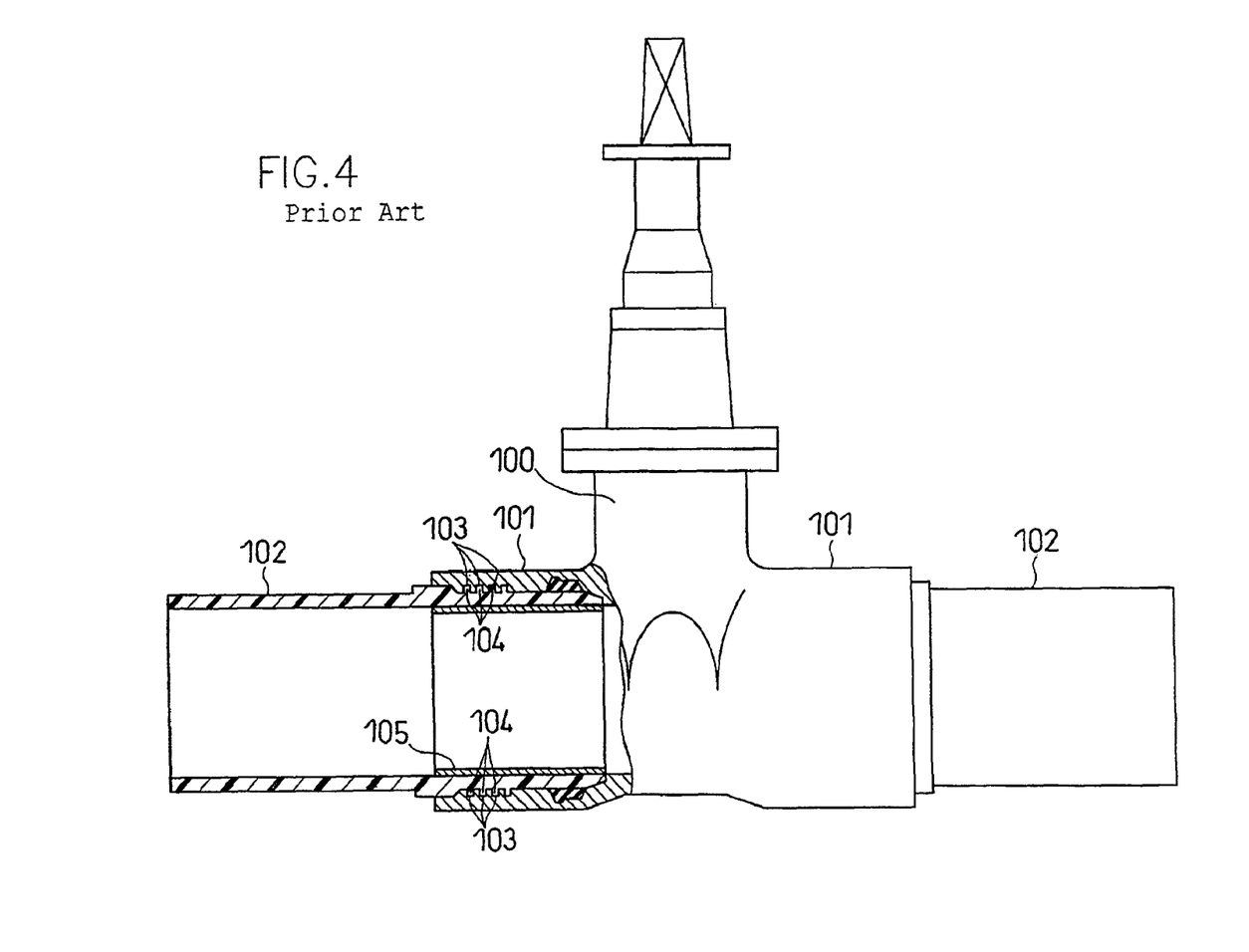
FIG. 4 is a schematic cross sectional view partially broken showing the conventional non-bolt joint structure.

In FIG. 4, a polyethylene pipe 102 is jointed to a metallic (FCD) first fluid conduit 101 being in communication with a valve casing 100.

In this conventional non-bolt joint structure, the metallic first fluid conduit 101 is jointed to the polyethylene pipe 102 in the way that an internal thread portion 103 is formed in an inner circumference of the first fluid conduit 101 while an external thread portion 104 is formed in an outer circumference of the polyethylene pipe 102, whereby the external thread portion 104 is threadably mounted on the internal thread portion 103. A numeral 105 describes an inner core.

However, in the conventional non-bolt joint structure, two pipes 101, 102 are jointed with each other by using a screw structure, thereby there is a need for casting a special polyethylene pipe having the screw structure.

SUMMARY OF THE INVENTION

Thus, a primary object of the present invention is to provide a non-bolt joint structure in which there is no need for casting a special polyethylene pipe.

Another object of the present invention is to provide a method for producing the non-bolt joint structure.

A non-bolt joint structure of a fluid conduit in which an insertion opening section of a polyethylene pipe is inserted into a receiving opening section of a first fluid conduit and the first fluid conduit and the polyethylene pipe are connected with each other without using bolts, the non-bolt joint structure comprising: a packing ring being inserted between the receiving opening section and the insertion opening section to seal between the receiving opening section and the insertion opening section; an engaging means being provided with an inner circumference of the receiving opening section, the engaging means preventing the polyethylene pipe from disengaging from the receiving opening section by engaging with an outer circumferential surface of the polyethylene pipe; and a tubular metallic inner core fitting into an inner circumference of the insertion opening section of the polyethylene pipe, wherein the inner core is being deformed plastically to include a first bulge portion, a cross-sectional shape of the first bulge portion is curved so as to bulge toward an outward radial direction, a second bulge portion is formed so that the insertion opening section of the polyethylene pipe is deformed so as to bulge toward the outward radial direction along the first bulge portion of the inner core, the first bulge portion of the inner core includes a first tapered portion, a diameter of the first tapered portion is gradually expanded as it goes to a back of the receiving opening section, and the polyethylene pipe is prevented from disengaging from the first fluid conduit by the engaging means engaging with a part of an outer circumferential surface of the second bulge portion corresponding to the first tapered portion.

In this aspect, unlike the conventional joint using screw, the polyethylene pipe and the first fluid conduit is joined together by the engaging means being engaged with the outer circumferential surface of the second bulge portion of the polyethylene pipe, thereby the polyethylene pipe is prevented from disengaging.

And, with a shape of the second bulge portion of the polyethylene pipe being kept by the first bulge portion in which the metallic inner core is plastically deformed, there is a small possibility that the second bulge portion is deformed with age. Thereby, there is a small possibility that the first fluid conduit is unexpectedly disengaged from the polyethylene pipe.

It is only necessary that the polyethylene pipe made by simply cutting a straight pipe is inserted into the receiving opening section. Therefore there is no need for casting a special polyethylene pipe using screw structure. And, it is enough to less parts since the bolt is not needed in this aspect.

With the inner core being plastically deformed by the jig, the polyethylene pipe and the first fluid conduit are connected with each other. Thereby, it is easy for connecting when constructed.

With the cross-sectional shape of the first bulge portion curving so as to bulge toward the outward radial direction, the outer circumferential surface of the second bulge portion may be curved along an inner side of the first fluid conduit. Thereby, it is expected that flexibility may be improved. That is, the outer circumferential surface of the second bulge portion may be curved along an inner circumferential surface of the first fluid conduit such as spherical plain bearing.

In the present invention, the term "cross-sectional" of the inner core means cross section including an axis line of the tubular inner core.

In the present invention, the first bulge portion of the inner core includes a first tapered portion, a diameter of the first tapered portion is gradually expanded as it goes to a back of the receiving opening section, and the engaging means engages with a part of the second bulge portion corresponding to the first tapered portion.

The part of the second bulge portion corresponding to the first tapered portion is formed as tapered shape so that a diameter of the second bulge portion is expanded as it goes to the back of the receiving opening section. The engaging means is engaged with the part of the tapered portion of the second bulge portion, thereby the polyethylene pipe is definitely prevented from disengaging.

In the present invention, it is preferred that a second tapered portion is provided at a back of the first tapered portion in the first bulge portion of the inner core and a diameter of the second tapered portion is gradually shrunk as it goes to the back of the receiving opening section.

In this case, the second bulge portion of the polyethylene pipe corresponding to the first bulge portion of the inner core is formed as barrel-shaped along the first bulge portion of the inner core. Thereby, the polyethylene pipe may be engaged like a joint with the inside of the first fluid conduit. Consequently, it is expected that flexibility may be improved.

In the present invention, it is preferred that the packing ring is positioned at the back of a position of the engaging means in the receiving opening section.

In this aspect, a part in which the first fluid conduit is joined with the polyethylene pipe can be formed compactly.

In the present invention, it is preferred that the engaging means is integrally formed with the first fluid conduit. In this aspect, a cost of manufacturing can be further cut.

A method for producing the non-bolt joint structure described above, the method comprising: a first insertion step of inserting the pre-deformation inner core into the inner circumference of the insertion opening section of the pre-deformation polyethylene pipe; a second insertion step of inserting the pre-deformation polyethylene pipe into the receiving opening section; and a diameter expansion step of plastically deforming the inner core with expanding the inner core by applying a force heading from an inside of the inner core to the outward radial direction to the inner core after the second insertion step.

DESCRIPTION OF THE REFERENCE NUMERALS

1: first fluid conduit
1a: receiving opening section
2: polyethylene pipe
2a: insertion opening section
3: packing ring
4: tubular inner core
11: engaging means
20: second bulge portion
40: first bulge portion
41: first tapered portion
42: second tapered portion
X1: back direction
X2: disengagement direction

DESCRIPTION OF THE PREFERRED EMBODIMENTS

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

First Embodiment

One embodiment of the present invention will now be described with reference to FIG. 1 and FIG. 2.

Figure 1:
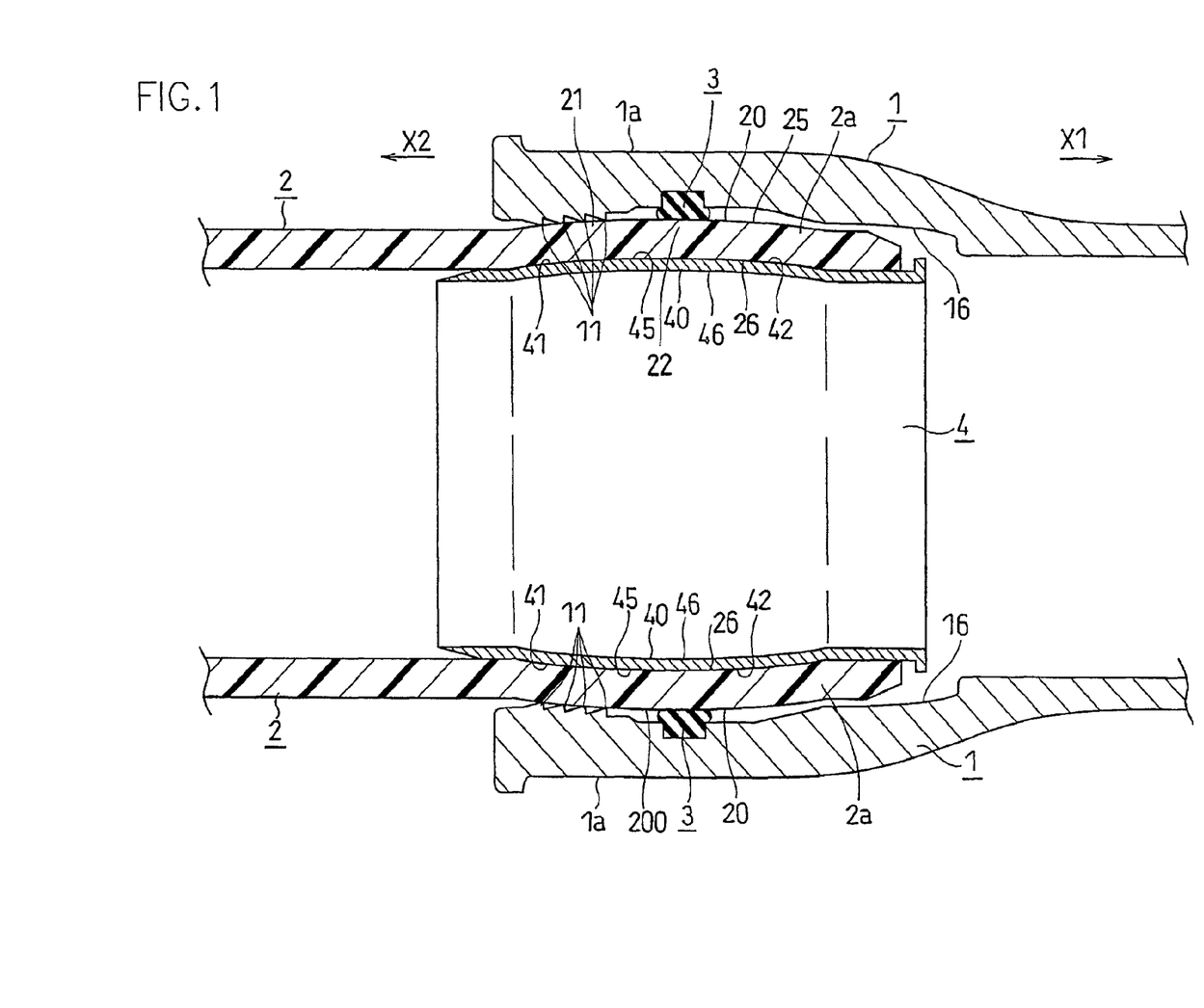
FIG. 1 is a schematic cross sectional view showing a non-bolt joint structure according to the first embodiment of the present invention.

Non-Bolt Joint Structure:

As shown in FIG. 1, an insertion opening section 2a of a polyethylene pipe 2 comprising a second fluid conduit is inserted into a receiving opening section 1a of a metallic first fluid conduit 1 like ductile cast iron.

The receiving opening portion 1a of the first fluid conduit 1 is, for example, a receiving opening portion of the first fluid conduit 101 shown in FIG. 4.

For example, a packing ring 3 foamed of a rubber etc. is inserted between the receiving opening section 1a and the insertion opening section 2a, thereby the packing ring 3 seals between the receiving opening section 1a and the insertion opening section 2a.

A tubular metallic inner core 4 is fitted on an inner circumference 26 of the insertion opening section 2a of the polyethylene pipe 2. The inner core 4 is plastically deformed by, for example, a jig not shown in FIG. 1. Thereby, a first bulge portion 40 is formed in the inner core 4, with a cross-sectional shape of the first bulge portion 40 curved so as to bulge toward the outward radial direction of the first fluid conduit 1.

A second bulge portion 20 is formed along the first bulge portion 40 of the inner core 4, with the insertion opening section 2a of the polyethylene pipe 2 being deformed so as to bulge toward outward radial direction of the first fluid conduit 1. That is, an outer circumferential surface 25 of the second bulge portion 20 is spherically formed.

Also, an engaging means 11 is formed in an inner circumference 16 of the receiving opening section 1a of the first fluid conduit 1. By engaging with the outer circumferential surface 25, the engaging means 11 prevents the polyethylene pipe 2 from disengaging from the receiving opening section 1a of the first fluid conduit 1. The engaging means 11 is integrally formed in the first fluid conduit 1, and formed as an annular ridge or a number of protrusions.

The plural ridge 11 has a larger diameter as it goes to the back direction X1 of the receiving opening section 1a. Thereby, each ridge 11 engages with a part of the second bulge portion 20 (engaged portion 21) corresponding to a first tapered portion 41. The first tapered portion 41 has a larger diameter as it goes to the back direction X1 of the receiving opening section 1a. An inner diameter of each ridge 11 is smaller than an outer diameter of a part of greatest dimension (top portion) of the second bulge portion 20 of the polyethylene pipe 2. In the case of employing a number of the protrusions as the engaging means 11, it can prevent the polyethylene pipe from circumferentially rotating.

First Bulge Portion 40:

The first tapered portion 41 is formed in the first bulge portion 40 of the inner core 4. The engaging means 11 is engaged with a part of the engaged portion 21.

The polyethylene pipe 2 is prevented from disengaging by the engaging means 11 engaging with the engaged portion 21.

When an inside of the polyethylene pipe 2 comes under pressure of fluids after the non-bolt joint structure of this embodiment has been constructed, the pressure of fluids makes the polyethylene pipe 2 slightly displace toward a disengagement direction X2. Thereby, the engaging means 11 is cut into the engaged portion 21, and then the polyethylene pipe 2 is prevented from disengaging from the first fluid conduit 1. Consequently, when the non-bolt joint structure of the present invention is manufactured, a diameter of the first bulge portion 40 is expanded so that the engaging means 11 contacts or cuts into the engaged portion 21.

A second tapered portion 42 is formed in the first bulge portion 40 of the inner core 4. A diameter of the second tapered portion 42 is gradually shrunk as it goes to the back direction X1 of the receiving opening section 1a of the first fluid conduit 1.

That is, the first and second bulge portions 40, 20 are formed as barrel-shaped by the engaged portion 21 becoming gradually having a large diameter as it goes to the back direction X1 of the receiving opening section 1a of the first fluid conduit 1 and the part becoming gradually having a small diameter as it goes to the back direction X1.

Packing Ring 3:

The packing ring 3 is located on the back direction X1 of the receiving opening section 1a at the back of the location of the engaging means 11 of the first fluid conduit 1. In this embodiment, the packing ring 3 is contacted with the outer circumferential surface of the polyethylene pipe 2 at the top 22.

Figure 2A:
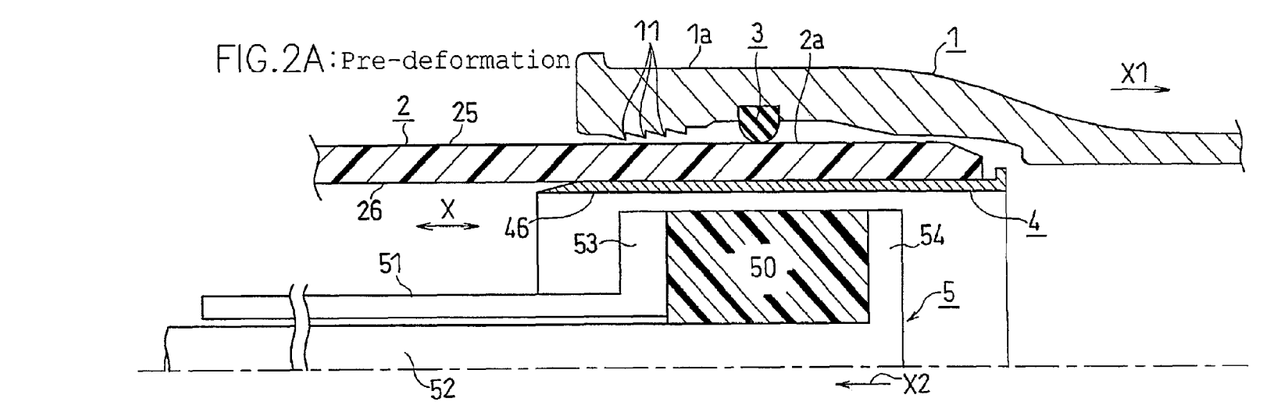
FIG. 2A and FIG. 2B are schematic cross sectional views each showing a method for producing the non-bolt joint structure according to the first embodiment of the present invention.
Figure 2B:
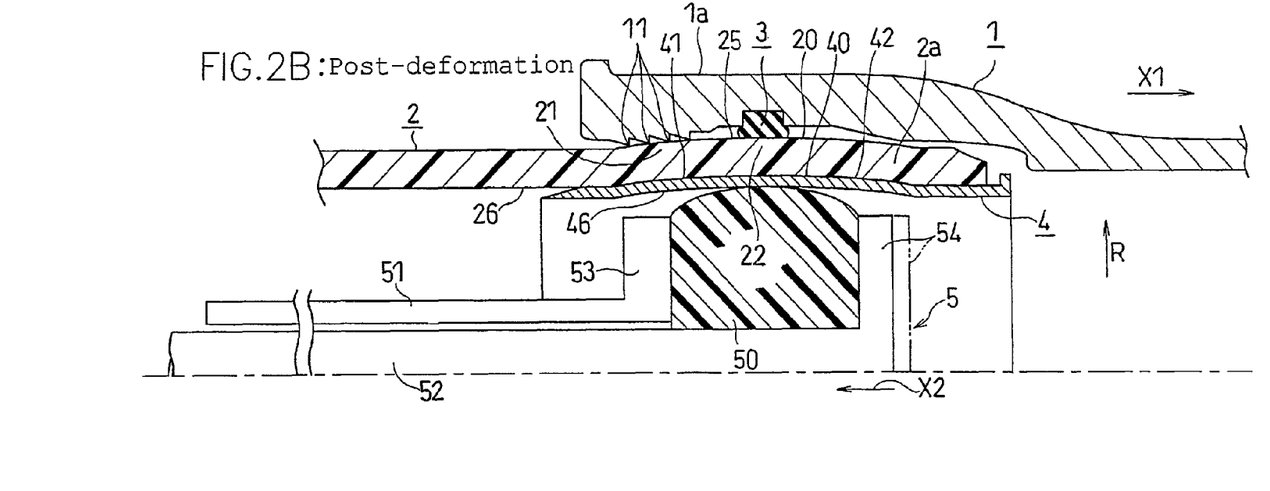

Jig 5:

For example, the jig 5 shown in FIG. 2A and FIG. 2B is used so as to form the first bulge portion 40 by plastically deforming the inner core 4.

As shown in FIG. 2A, the jig 5 comprises a press portion 50, a cylinder portion 51 and a slider 52. The cylinder portion 51 is formed with extending along a tube axis direction X of the first fluid conduit 1 and the polyethylene pipe 2. And, a first flange portion 53 is formed at an end of the back direction X1 of the cylinder portion 51.

The slider 52 is formed so as to freely slide in the cylinder portion 51 along the tube axis direction X. A second flange portion 54 is formed at the end of the back direction X1 of the slider 52.

The press portion 50 formed of like urethane rubber is annularly provided between the first flange portion 53 of the cylinder portion 51 and the second flange portion 54 of the slider 52. It is preferred that an axial length of the press portion 50 is covered over an area in which the inner core 4 being plastically deformed.

Method for Producing Non-Bolt Joint Structure:

The first fluid conduit 1 and the polyethylene pipe 2 may be shipped after being connected with each other in a factory or may be connected with each other at outdoors like construction field.

First Insert Step:

First, as shown in FIG. 2A, the pre-deformation inner core 4 having a uniformity external diameter is inserted into the inner circumferential 26 of the insertion opening section 2a of the pre-deformation polyethylene pipe 2.

Second Insert Step:

After the first insert step, the pre-deformation polyethylene pipe 2 with the inner core 4 is inserted into the receiving opening section 1a of the first fluid conduit 1. As shown in FIG. 4, the receiving opening section 1a may be communicated with an inside of the valve casing 100 for example.

Diameter Expansion Step:

After the second insert step, as shown in FIG. 2A, the jig 5 is inserted into the inner core 4. When the cylinder portion 51 is set in a predetermined position located to the polyethylene pipe 2, the slider 52 is pulled. Thereby, the second flange portion 54 shown by a two-dot chain line in FIG. 2B is displaced toward the disengagement direction X2 shown by a solid line in FIG. 2B. By this displacement, the press portion 50 is pressed between the second flange 54 and the first flange 53 and is extruded toward the inner core 4. The press portion 50 contacts with an inside 46 of the inner core 4 and extrudes the inner core 4, thereby a certain force heading from the inside 46 of the inner core 4 to an outward direction of a diametral direction R is applied to the inner core 4. Consequently, an outside 45 (FIG. 1) is extruded by the inner core 4 toward the outward direction of the diametral direction R, thereby a diameter of the inner core 4 is expanded and a work-hardening phenomenon in which the inner core 4 being plastically deformed and never being restored is generated. At the same time, a diameter of the polyethylene pipe 2 is expanded by the diameter expansion of the inner core 4, thereby the second bulge portion 20 is formed in the polyethylene pipe 2. A diameter of the second bulge portion 20 expands until the engaged portion 21 is contacted with the plural ridge 11 of the receiving opening section 1a. With the second bulge portion 20 being formed, the engaged portion 21 can be engaged with the ridge 11, thereby the polyethylene pipe 2 is prevented from disengaging and the packing ring 3 is undergone the compression deformation to closely contact with the outer circumferential surface 25 of the polyethylene pipe 2.

Extraction of Jig 5:

After the diameter expansion, the jig 5 is extracted from the inner core 4 and the polyethylene pipe 2 after the deformation of the press portion 50 is restored by displacing the slider 52 to the back direction X1. The inner core 4 plastically deformed can keep its deformed shape by the work-hardening resulted from the plastic deformation even after the press portion 50 is extracted. Thereby, the polyethylene pipe 2 can also keep its shape.

Second Embodiment

Figure 3A:
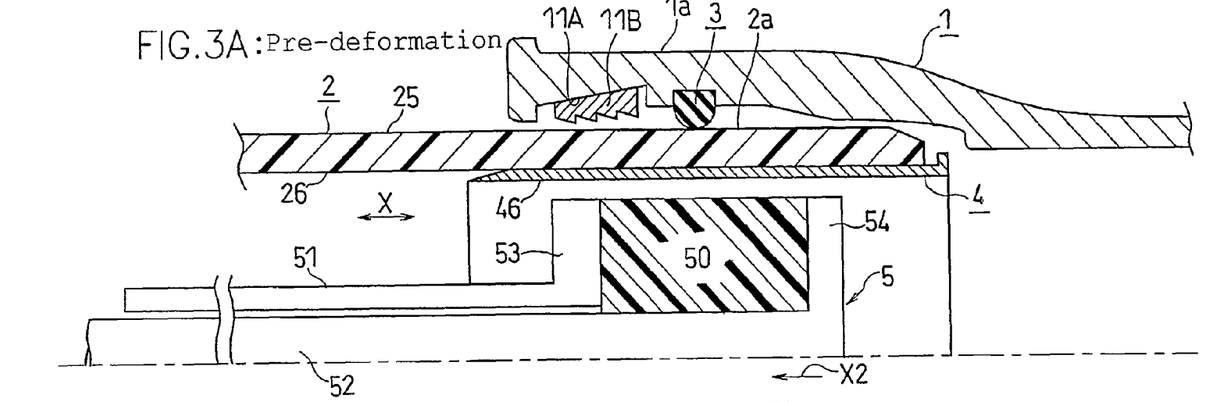
FIG. 3A and FIG. 3B are schematic cross sectional views each showing a non-bolt joint structure according to the second embodiment of the present invention.
Figure 3B:
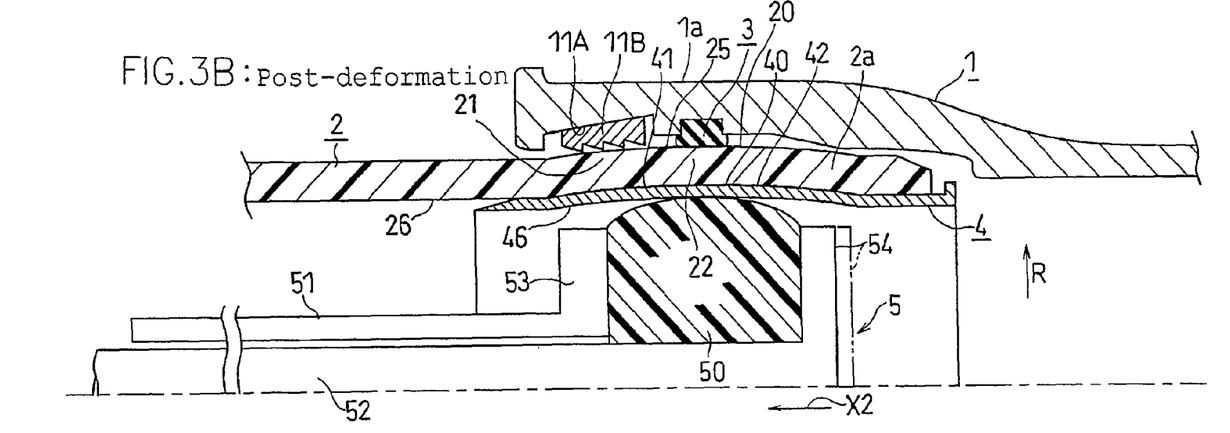

An embodiment is described in FIG. 3.

As shown in FIG. 3A, an engaging means 11B and the first fluid conduit 1 are separately provided. A contact surface 11A contacting the engaging means 11B of the first fluid conduit 1 is formed in a tapered shape so as to become having a large diameter as it goes to the back direction X1 of the engaging means 11B.

Thereby, after the non-bolt joint structure of this embodiment being constructed, the diameter of the polyethylene pipe 2 shown in FIG. 3B is expanded by such as water pressure, and the engaging means 11B is displaced to the disengagement direction X2 along an inclination of the contact surface 11A. Thereby, the engaging means 11B is tightly cut into the engaged portion 21.

The other structures are similar to those of the first embodiment for which like members are denoted by like reference numerals and will not be further described below.

It is not necessarily the case that the first fluid conduit 1 is formed in the valve casing 100. It is acceptable that any can be employed as the jig 5 if it can form the first bulge portion 40 in the inner core 4.

And, although the first and second bulge portions 40, 20 is formed as barrel-shaped in each embodiment, a diameter of the inner core or the polyethylene pipe may be expanded as a tapered shape as the inner core or the polyethylene pipe goes to the back direction.

It is not necessarily the case that the shape of the inner core is complete annulus ring. It may be acceptable that the shape of the inner core is annulus having a slit extending the axial direction, that is, C character shaped.

Third Embodiment

Figure 6A:
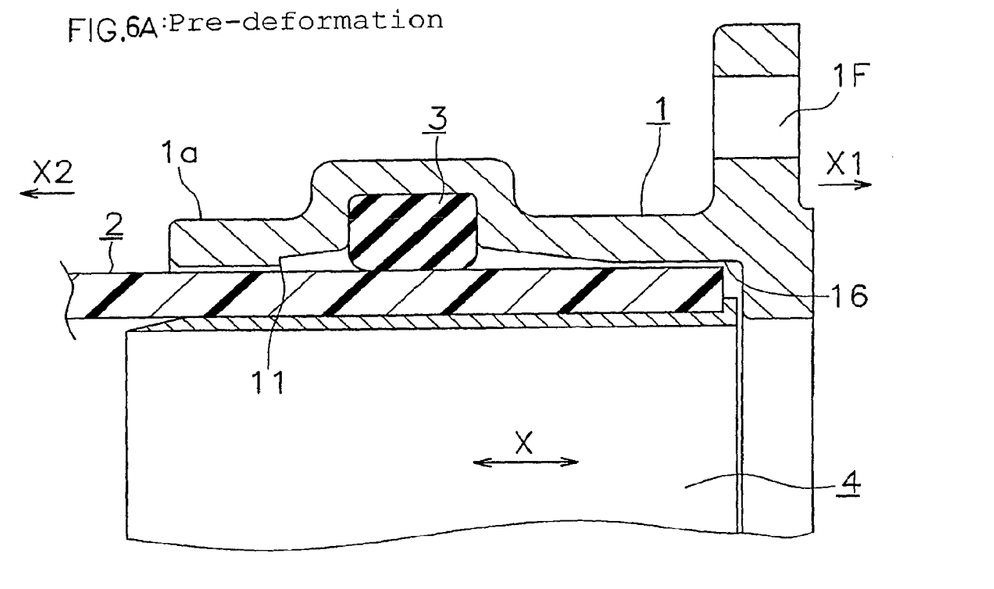
FIG. 6A and FIG. 6B are schematic cross sectional views each showing a method for producing a non-bolt joint structure according to the third embodiment of the present invention.
Figure 6B:
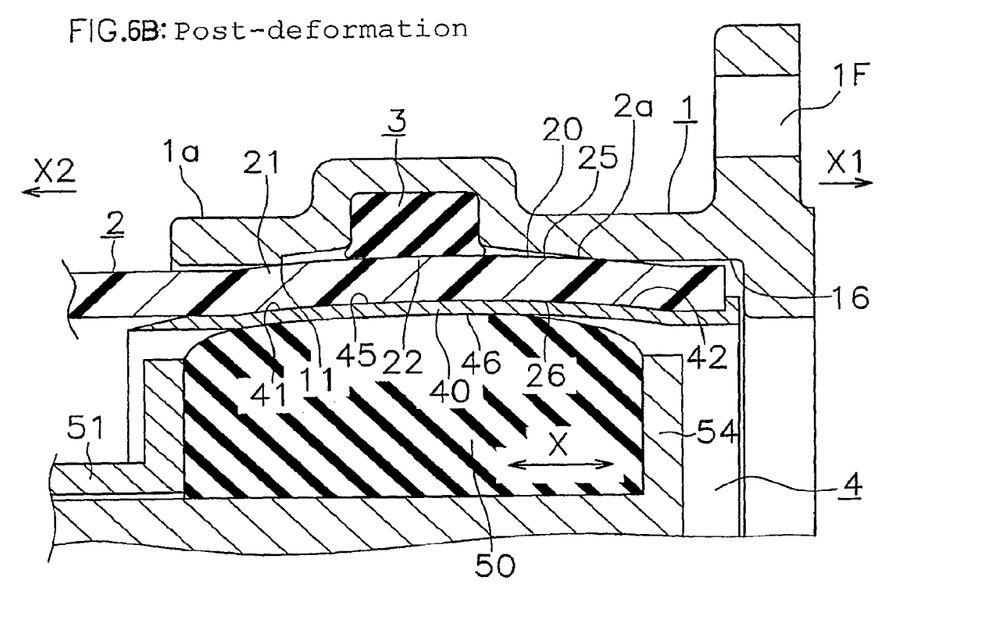
Figure 7:
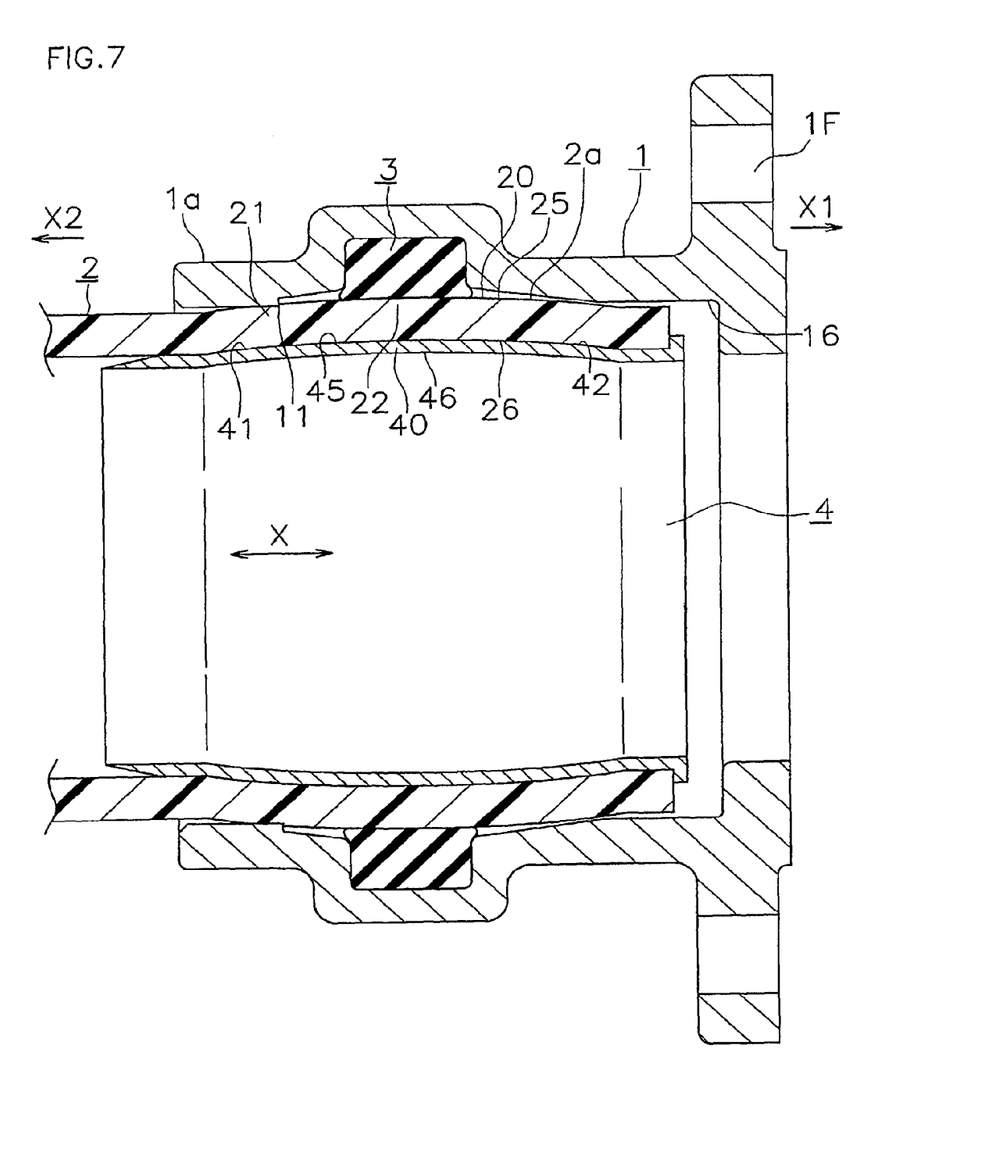
FIG. 7 is a schematic cross sectional view showing the non-bolt joint structure under pressurization according to the third embodiment of the present invention.

FIG. 6A, FIG. 6B and FIG. 7 describe a third embodiment.

As shown in FIG. 6A, the engaging means 11 of the first fluid conduit is formed with an edge 11 being annularly integrally formed with the first fluid conduit. The edge 11 corresponds to the ridge 11 of the first embodiment, and has a smaller inner diameter than the outer diameter of the top portion 22 of the expanded second bulge portion 20.

A flange 1F is formed in the first fluid conduit.

As shown in FIG. 6B, if the polyethylene pipe 2 is expanded by the jig 5 (not shown), the edge 11 which is an engaging means contacts with the engaged portion 21. And, if separation force made by water pressure applies to the polyethylene pipe 2, which is under pressurization, the engaged portion 21 cuts into the edge 11 as shown in FIG. 7.

In the second bulge portion 20, the engaged portion 21 and a part becoming gradually having a small diameter are integrally formed as barrel-shaped. And the edge 11 of the engaging means is cut into the engaged portion 21 at the part becoming gradually having a large diameter, which is in front of the top portion 22 of the second bulge portion 20 (the disengagement direction X2 of the receiving opening section 1a of the first fluid conduit 1), therefore the polyethylene pipe is prevented from disengaging.

The edge 11 may be formed so as to be cut into the second bulge portion 20 in front of the top portion 22 of the second bulge portion.

In this embodiment, the number of the edge 11 of the engaging means corresponding to the ridge 11 is one, so the bite or deformation of the polyethylene pipe to the ridge 11 becomes larger, therefore there is a possibility that creep phenomenon will occur. Consequently, it is preferred that the ridge 11 is provided plurally.

The other structures are similar to those of the first embodiment for which like members are denoted by like reference numerals and will not be further described below.

Fourth Embodiment

Figure 8:
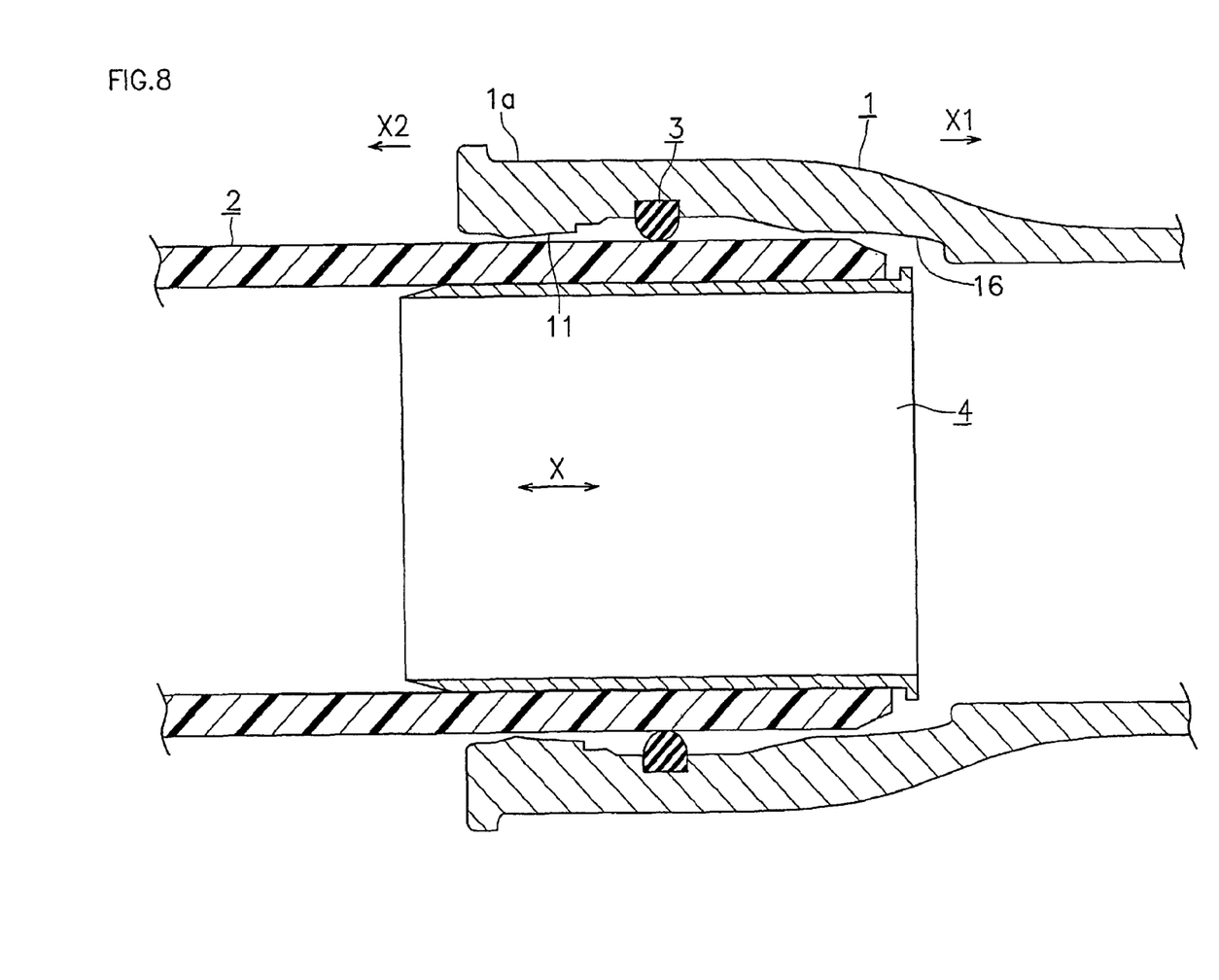
FIG. 8 is a schematic cross sectional view showing a method for producing a non-bolt joint structure according to the fourth embodiment.
Figure 9:
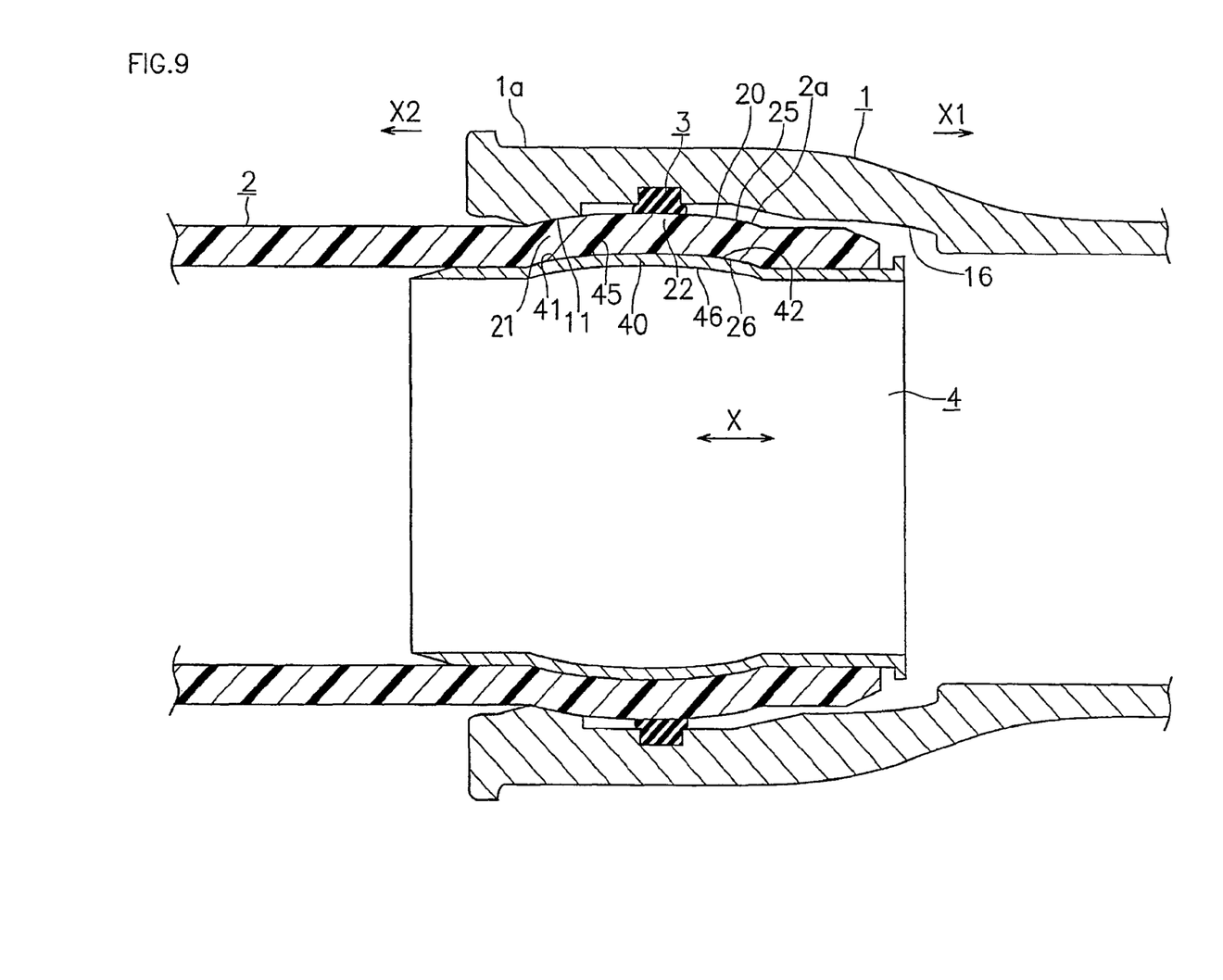
FIG. 9 is a schematic cross sectional view showing a method for producing a non-bolt joint structure according to a fourth embodiment.

FIG. 8 and FIG. 9 describe a fourth embodiment.

As shown in FIG. 8, the engaging means 11 of the first fluid conduit 1 is integrally formed with the first fluid conduit 1 and is formed in a shape of schematic conic surface slightly opening toward the packing ring 3.

As shown in FIG. 9, if the polyethylene pipe 2 is expanded by, for example, a jig (not shown), an engaging surface 11 which is an engaging means contacts with the engaged portion 21 with little space between them.

In the second bulge portion 20, the engaged portion 21 and a part becoming gradually having a small diameter are formed as barrel-shaped. The engaging surface 11 contacts the engaged portion 21 with little space between them at the part becoming gradually having a large diameter, which is in front of the top portion 22 of the second bulge portion 20 (the disengagement direction X2 of the receiving opening section 1a of the first fluid conduit 1), therefore the polyethylene pipe 2 is prevented from disengaging.

Plural needle or wedge protrusion may be formed in the engaging surface 11.

The other structures are similar to those of the first embodiment for which like members are denoted by like reference numerals and will not be further described below.

For example, the jig 5 shown in FIG. 10A to FIG. 10D may be used for expanding a diameter of the polyethylene pipe 2.

Figure 10A:
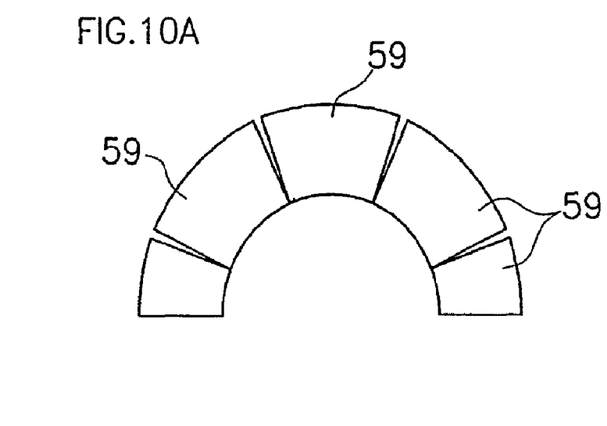
FIG. 10A is a schematic transverse sectional view showing a modified embodiment of a jig.
Figure 10B:
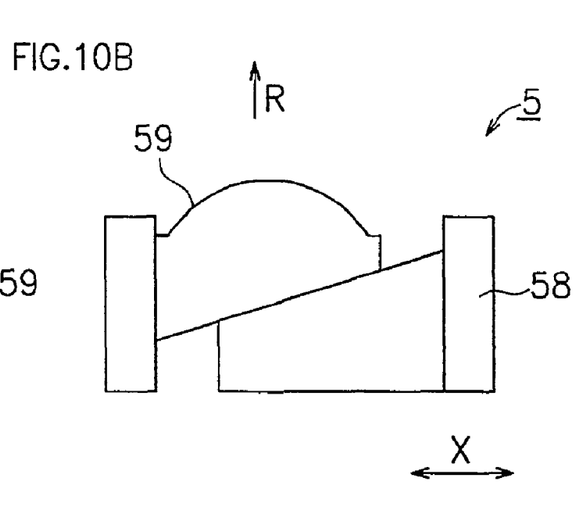
FIG. 10B is a schematic side view thereof.

As shown in FIG. 10B, the jig 5 includes a wedge slider 58 and a press portion 59. The wedge slider 58 and the press portion 59 are formed in an intended up and down position. As shown in FIG. 10A, the press portion 59 is formed of plural segment.

As shown in FIG. 10B, the wedge slider 58 is provided so as to freely slide along the tube axis direction X. The press portion 59 is provided so as to freely slide along the diametral direction R.

Figure 10C:
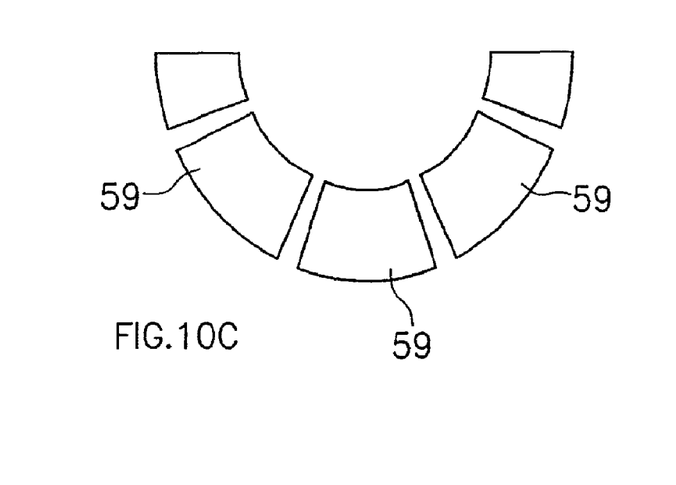
FIG. 10C is a schematic transverse sectional view showing the jig in which its diameter is expanded.
Figure 10D:
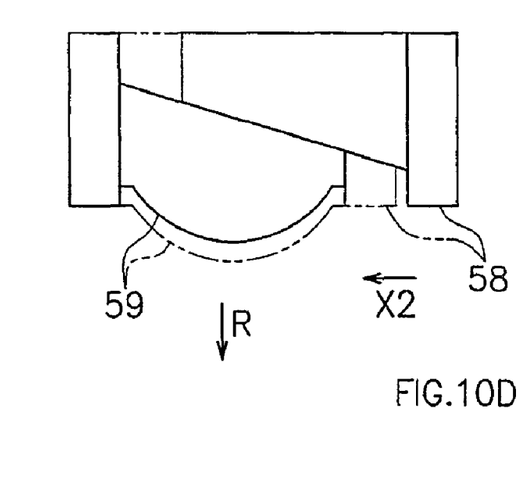
FIG. 10D is a schematic side view thereof.

As shown in FIG. 10D, if the wedge slider 58 slides to the disengagement direction X2, the press portion 59 is displaced toward outward direction of the diametral direction R by the wedge slider 58 as shown in FIG. 10C and the two-dot chain line of FIG. 10D. Therefore, the inner core 4 not shown in FIG. 10A to FIG. 10D is plastically deformed and its diameter is expanded.

Figure 11A:
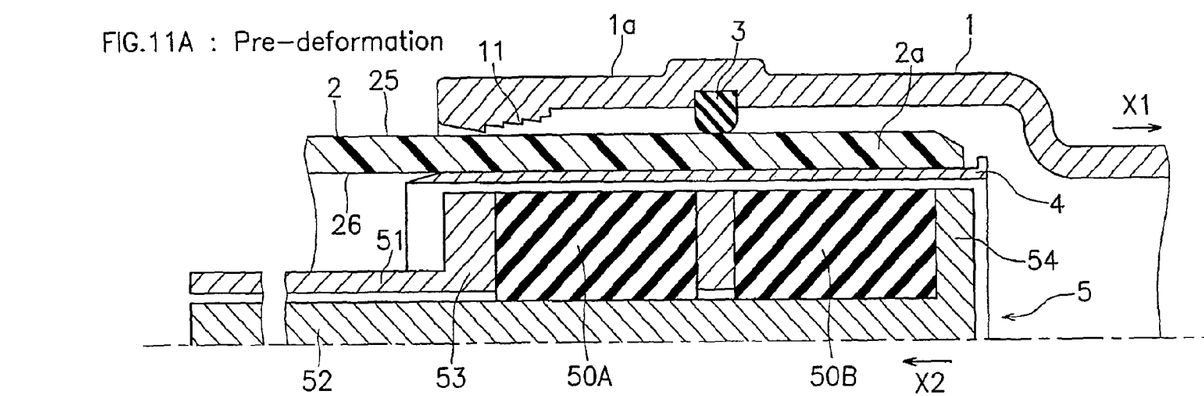
FIG. 11A and FIG. 11B are schematic cross sectional views each showing a method for producing a non-bolt joint structure according to a fifth embodiment.
Figure 11B:
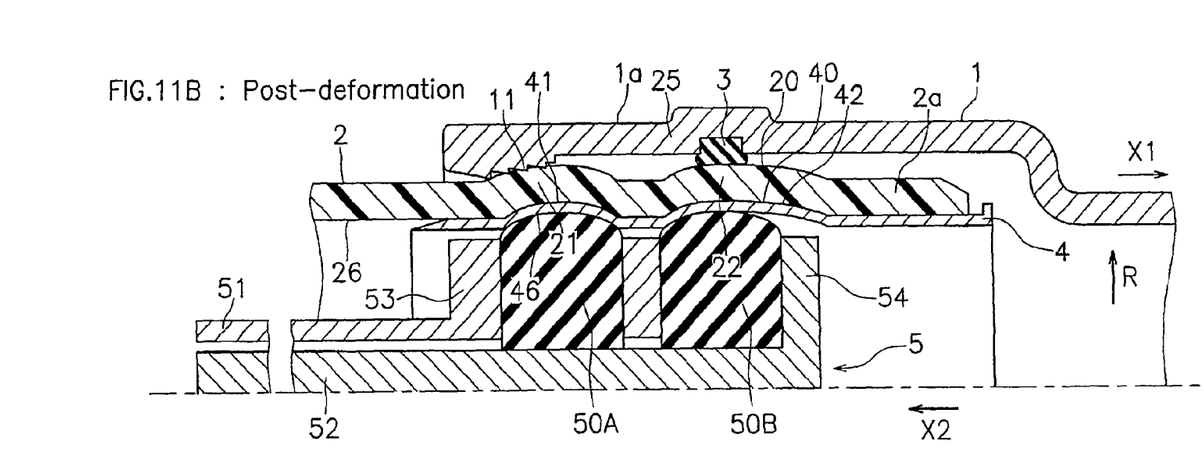

In an embodiment shown in FIG. 11A and FIG. 11B, press portions 50A, 50B are provided. This embodiment can be preferably used when a bore diameter of pipe is small.

The first press portion 50A plastically deforms the inner core 4 in an inside of the engaging means 11 to expand the inner core 4 and the polyethylene pipe 2. As a result of this deformation, the engaged portion 21 engages with the engaging means 11, therefore the polyethylene pipe 2 is prevented from disengaging.

The second press portion 50B plastically deforms the inner core 4 in an inside of the packing ring 3 to expand the inner core 4 and the polyethylene pipe 2. As a result of this deformation, the top portion 22 is brought into contact with the packing ring 3, therefore sealing between the first fluid conduit 1 and the polyethylene pipe 2 can be done.

To form the first bulge portion 40, as described in each embodiment, bulge processes expanding a part of the inner core 4 by an inner pressure can be used. A number of publicity methods using rubber, metal or fluid pressure may be used for the bulge processes.

INDUSTRIAL APPLICABILITY

The present invention can be applied to the non-bolt joint structure connecting the two pipes with each other and the method for producing the non-bolt joint structure.

What is claimed is:

1. A non-bolt joint structure comprising:
a fluid conduit having a receiving opening section;
a polyethylene pipe having an insertion opening section, the insertion opening section being configured to be inserted into the receiving opening section, and an inner circumference of the receiving opening section including a means for engaging an outer circumferential surface of an engaged portion of the polyethylene pipe to connect the fluid conduit to the polyethylene pipe without using bolts and to prevent the polyethylene pipe from disengaging from the receiving opening section;
a packing ring inserted between the receiving opening section and the insertion opening section to seal between the receiving opening section and the insertion opening section; and
a tubular metallic inner core fit into an inner circumference of the insertion opening section of the polyethylene pipe;
wherein the inner core includes a bulge portion that is in a plastically deformed state, a cross-sectional shape of the bulge portion along an axis of the inner core being curved to bulge in an outward radial direction toward the fluid conduit from the axis of the inner core;
wherein the polyethylene pipe is in a deformed state so as to include a bulge portion, the bulge portion of the polyethylene pipe being formed as a result of the bulge portion of the inner core and having an inner circumferential surface that is in close contact with an outer circumferential surface of the bulge portion of the inner core, a cross-sectional shape of the bulge portion of the polyethylene pipe along the axis being curved to bulge in the outward radial direction,
wherein the bulge portion of the inner core includes a first tapered portion, a diameter of the first tapered portion gradually expanding as the first tapered portion extends into the fluid conduit in a longitudinal direction from an opening in the receiving opening section; and
wherein the engaged portion is formed on the outer circumferential surface of the bulge portion of the polyethylene pipe by the bulge portion of the polyethylene pipe bulged in the outward radial direction, a diameter of the engaged portion gradually expanding as the engaged portion extends into the fluid conduit in the longitudinal direction from the opening, and the means for engaging by engaging the outer circumferential surface of the engaged portion of the polyethylene pipe prevents the polyethylene pipe from disengaging from the fluid conduit.

2. A non-bolt joint structure according to claim 1, wherein the packing ring is in a deformed state between the bulge portion of the polyethylene pipe bulged in the outward radial direction and the fluid conduit, the deformed packing ring sealing between the outer circumferential surface of the bulge portion of the polyethylene pipe and the inner circumference of the receiving opening section.

3. A non-bolt joint structure according to claim 2, wherein the bulge portion of the inner core includes a second tapered portion located further from the opening in the receiving opening section than the first tapered portion, a diameter of the second tapered portion gradually decreasing as the second tapered portion extends into the fluid conduit in the longitudinal direction from the opening in the receiving opening section.

4. A non-bolt joint structure according to claim 3, wherein the packing ring is located further from the opening in the receiving opening section than the means for engaging.

5. A non-bolt joint structure according to claim 4, wherein the packing ring is provided between the first tapered portion and the second tapered portion.

6. A non-bolt joint structure according to claim 1, wherein the means for engaging is integrally formed with the fluid conduit.

7. A non-bolt joint structure according to claim 1, wherein the means for engaging cuts into the engaged portion to prevent the polyethylene pipe from disengaging.

8. A non-bolt joint structure according to claim 7, wherein the means for engaging is an edge that cuts into the engaged portion.

9. A method for producing the non-bolt joint structure described in claim 1, the method comprising:
a first insertion step of inserting the inner core into the inner circumference of the insertion opening section of the polyethylene pipe prior to the inner core and polyethylene pipe being deformed;
a second insertion step of inserting the polyethylene pipe into the receiving opening section prior to the inner core and polyethylene pipe being deformed; and
a diameter expansion step of plastically deforming the inner core by applying a force to the inner core from an inside of the inner core in the outward radial direction with respect to the axis of the inner core after the second insertion step.

10. A method for producing a non-bolt joint structure, the non-bolt structure comprising:
a fluid conduit having a receiving opening section, an inner circumference of the receiving opening section including an engaging means;
a polyethylene pipe having an insertion opening section, the insertion opening section being configured to be inserted into the receiving opening section, wherein the polyethylene pipe and the fluid conduit are configured to be connected without using bolts;

a packing ring inserted between the receiving opening section and the insertion opening section to seal between the receiving opening section and the insertion opening section; and a tubular metallic inner core fit into an inner circumference of the insertion opening section of the polyethylene pipe;

wherein the engaging means is configured to prevent the polyethylene pipe from disengaging from the receiving opening section by engaging with an outer circumferential surface of an engaged portion of the polyethylene pipe;

wherein the inner core includes a bulge portion that is in a plastically deformed state, a cross-sectional shape of the bulge portion along an axis of the inner core being curved to bulge in an outward radial direction toward the fluid conduit from the axis of the inner core;

wherein the polyethylene pipe is in a deformed state so as to include a bulge portion, the bulge portion of the polyethylene pipe being formed as a result of the bulge portion of the inner core and having an inner circumferential surface that is in close contact with an outer circumferential surface of the bulge portion of the inner core, a cross-sectional shape of the bulge portion of the polyethylene pipe along the axis being curved to bulge in the outward radial direction, wherein the bulge portion of the inner core includes a first tapered portion, a diameter of the first tapered portion gradually expanding as the first tapered portion extends into the fluid conduit in a longitudinal direction from an opening in the receiving opening section; and wherein the engaged portion is formed on the outer circumferential surface of the bulge portion of the polyethylene pipe by the bulge portion of the polyethylene pipe bulged in the outward radial direction, a diameter of the engaged portion gradually expanding as the engaged portion extends into the conduit in the longitudinal direction from the opening, and the polyethylene pipe is prevented from disengaging from the fluid conduit by the engaging means engaging with the outer circumferential surface of the engaged portion;

the method comprising:

a first insertion step of inserting the inner core into the inner circumference of the insertion opening section of the polyethylene pipe, an outer diameter of the inner core being uniform and an inner diameter of the insertion opening section being uniform, a second insertion step of inserting the polyethylene pipe having the uniform inner diameter into the receiving opening section of the fluid conduit, which the packing ring is attached to, with the inner core having the uniform outer diameter being inserted into the polyethylene pipe, a diameter expansion step of carrying out a diameter expansion that expands the diameter of the inner core in the outward radial direction by applying a force to the inner core from an inside of the inner core in the outward radial direction with respect to the axis of the inner core as well as carrying out a plastic deformation of the inner core, the diameter expansion step being carried out after the second insertion step, whereby a work hardening phenomenon in which the inner core is plastically deformed and is never restored to its original shape occurs, wherein as a result of the expansion of the inner core and the plastic deformation of the inner core, the diameter of the polyethylene pipe is expanded in the outward radial direction by the inner core pushing the inner circumference of the polyethylene pipe in the outward radial direction, whereby the bulge portion is formed in the polyethylene pipe, wherein a diameter of the bulge portion of the polyethylene pipe is expanded until the engaged portion of the polyethylene pipe abuts on the engaging means of the receiving opening section, wherein by the bulge portion being formed in the polyethylene pipe, the engaged portion of the bulge portion of the polyethylene pipe is engageable with the engaging means, whereby a function preventing the polyethylene pipe from disengaging from the fluid conduit is fulfilled as well as the packing ring being compressingly deformed to be in close contact with the outer circumferential surface of the polyethylene pipe.

11. A method for producing the non-bolt joint structure according to claim 10, wherein the diameter expansion step comprises the steps of:

inserting a press portion into the inner core; and pressing the press portion in a longitudinal direction of the polyethylene pipe to expand the press portion in the outward radial direction so as to apply a force to the inner core from the inside of the inner core in the outward radial direction and expand the diameter of the inner core.

* * * * *